United States Patent
Nagai

[11] Patent Number: 5,564,078
[45] Date of Patent: Oct. 8, 1996

[54] PORTABLE RADIO APPARATUS WITH A FOLDING STRUCTURE

[75] Inventor: Michio Nagai, Tokyo, Japan

[73] Assignee: NEC Corporation, Tokyo, Japan

[21] Appl. No.: 310,077

[22] Filed: Sep. 22, 1994

[30] Foreign Application Priority Data

Sep. 30, 1993 [JP] Japan ................... 5-268291

[51] Int. Cl.$^6$ ................... H04B 1/38
[52] U.S. Cl. ................... 455/89; 455/90
[58] Field of Search ................ 455/33.1, 89, 90, 455/95, 351; 379/58, 59, 433, 434, 428; 364/708, 709; 341/22, 23

[56] References Cited

U.S. PATENT DOCUMENTS

| | | | |
|---|---|---|---|
| 4,279,021 | 7/1981 | See et al. | 364/709.01 |
| 4,517,660 | 5/1985 | Fushimoto et al. | 364/708.1 |
| 4,855,746 | 8/1989 | Stacy | 341/23 |
| 5,054,051 | 10/1991 | Hoff | 379/433 |
| 5,151,946 | 9/1992 | Martensson | 379/433 |
| 5,257,310 | 10/1993 | Takagi et al. | 379/433 |
| 5,333,176 | 7/1994 | Burko et al. | 455/90 |
| 5,369,788 | 11/1994 | Nagai | 455/90 |
| 5,436,625 | 7/1995 | Kubo | 341/22 |
| 5,436,954 | 7/1995 | Nishiyama et al. | 455/90 |

FOREIGN PATENT DOCUMENTS

| | | |
|---|---|---|
| 0414365A3 | 2/1991 | European Pat. Off. . |
| 4-04023547A | 1/1992 | Japan ................... 379/437 |
| 4-307841 | 10/1992 | Japan . |
| 2235850A | 3/1991 | United Kingdom ........... 379/433 |
| 2275587 | 8/1994 | United Kingdom . |
| WO9307680 | 4/1993 | WIPO . |

*Primary Examiner*—Reinhard J. Eisenzopf
*Assistant Examiner*—Marsha D. Banks-Harold
*Attorney, Agent, or Firm*—Sughrue, Mion, Zinn, Macpeak & Seas

[57] ABSTRACT

A portable radio apparatus comprising a first housing body having at least a key operation pad with a plurality of keys, and a second housing body connected to the first housing body in such a manner that they are freely opened and closed with each other. The key operation pad of the first housing body is covered with the second housing body, when necessary. The second housing body is provided with an opening or a push button so that at least one key is operated in a state in which the first and second housing bodies are closed.

21 Claims, 15 Drawing Sheets

PORTABLE RADIO APPARATUS WITH A FOLDING STRUCTURE

FIELD OF THE INVENTION

The present invention relates in general to a portable radio apparatus, and in particular to an improvement in a portable radio apparatus in which the key operation pad or pushbutton dialing pad can be covered with the housing body, when necessary.

DESCRIPTION OF THE PRIOR ART

It is well known in a portable radio apparatus, such as a portable radio transmitter-receiver, that adopting a folding structure enhances its portability. In the portable radio apparatus of the folding structure type, when the cover is opened or unfolded, the key operation pad is exposed and the apparatus becomes a suitable size for use. When the cover is closed or folded, the key operation pad is covered and the apparatus becomes handy to carry.

Figure 1:
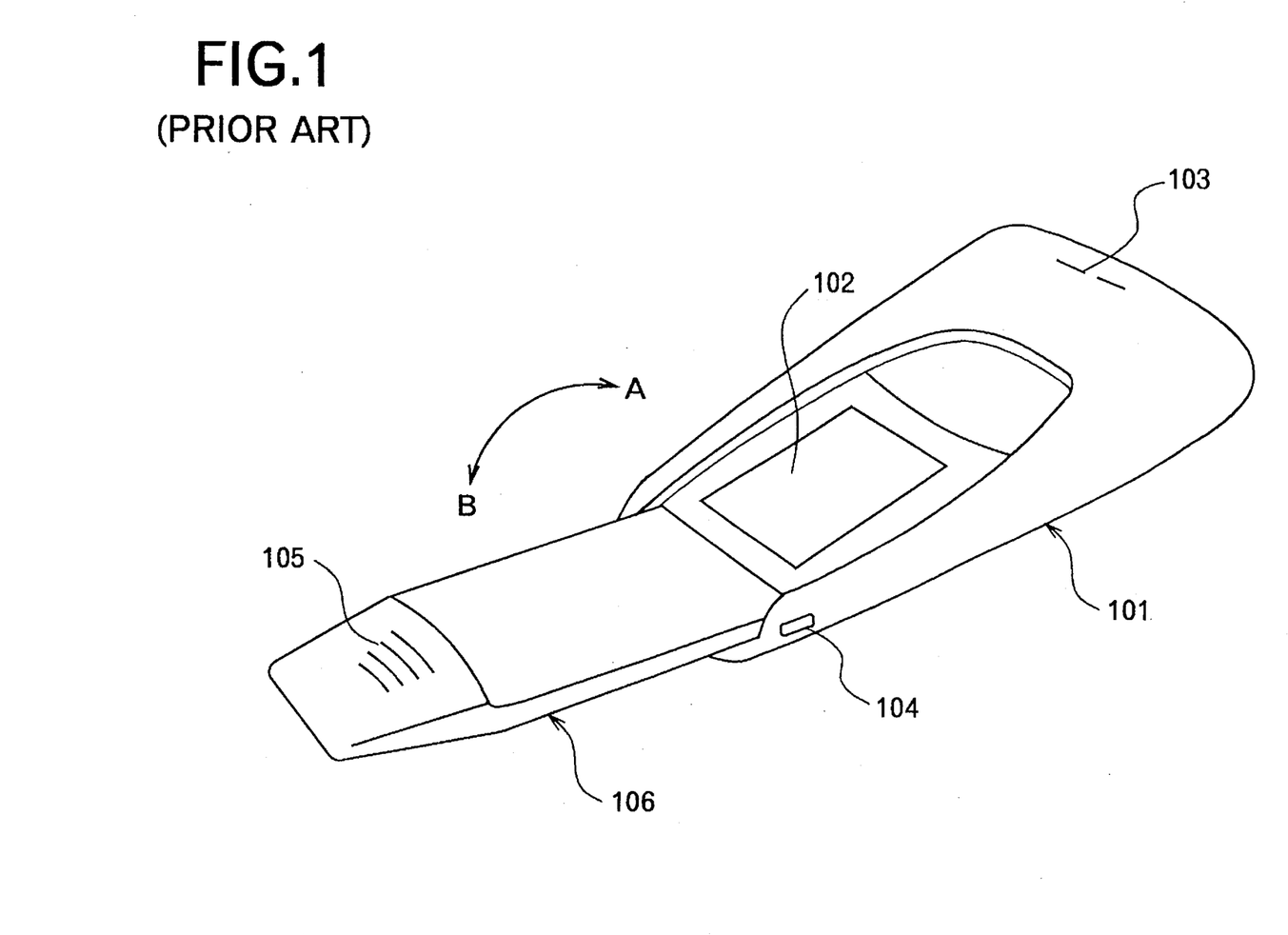
FIG. 1 is a perspective view showing a conventional radio apparatus.

A conventional portable radio apparatus such like this is shown in FIG. 1 and disclosed in Japanese Laid-open Patent Application No. HEI 4-307841. In the figure, a housing main body 101 is provided with a key operation pad such as a pushbutton dialing pad 102 and a microphone 103. A cover 106 with a speaker 105 is rotatably connected through a hinge 104 to the upper end of the main body 101. The cover 106 is freely rotatable on the hinge 104 in the directions indicated by arrow marks A and B of FIG. 1. When the portable radio apparatus is in its inoperative state, the cover 106 is closed in the direction A and housed in the main body 101, so that the key operation pad 102 is protected and the apparatus becomes handy to carry. When, on the other hand, the portable radio apparatus is in its operative state, the cover 106 is opened in the direction B, the key operation pad 102 is exposed, and then the microphone 103 and the speaker 105 are located into a suitable position for use.

However, in the above-described portable radio apparatus, since the key operation pad 102 of the main body 101 will be entirely covered if the cover 106 is closed, there was the problem that the key operation cannot be performed unless the cover 106 is opened.

It is, accordingly, an important object of the present invention to provide a portable radio apparatus having a structure which can enhance the key operability as the cover is closed.

SUMMARY OF THE INVENTION

To achieve this end, there is provided according to the present invention a portable radio apparatus comprising a first housing body having at least a key operation pad with a plurality of keys; and a second housing body connected to the first housing body in such a manner that the apparatus can be freely opened and closed. The key operation pad of the first housing body is covered by the second housing body, when necessary. The second housing body is provided with key operation means for operating at least one key when the apparatus is closed.

Preferably, the key operation means is comprised of an opening so that at least one key of the key operation pad is exposed through the opening portion when the apparatus is closed. In addition, the second housing body may also be provided with key pushing means by which at least one key of the key operation pad is operated when the apparatus is closed.

According to the portable radio apparatus having the above-described structure, since a necessary key is exposed through the opening of the second housing body or can be operated by the key pushing means when the apparatus is closed, the key operation can be performed without opening the apparatus when the apparatus is being carried.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 2:
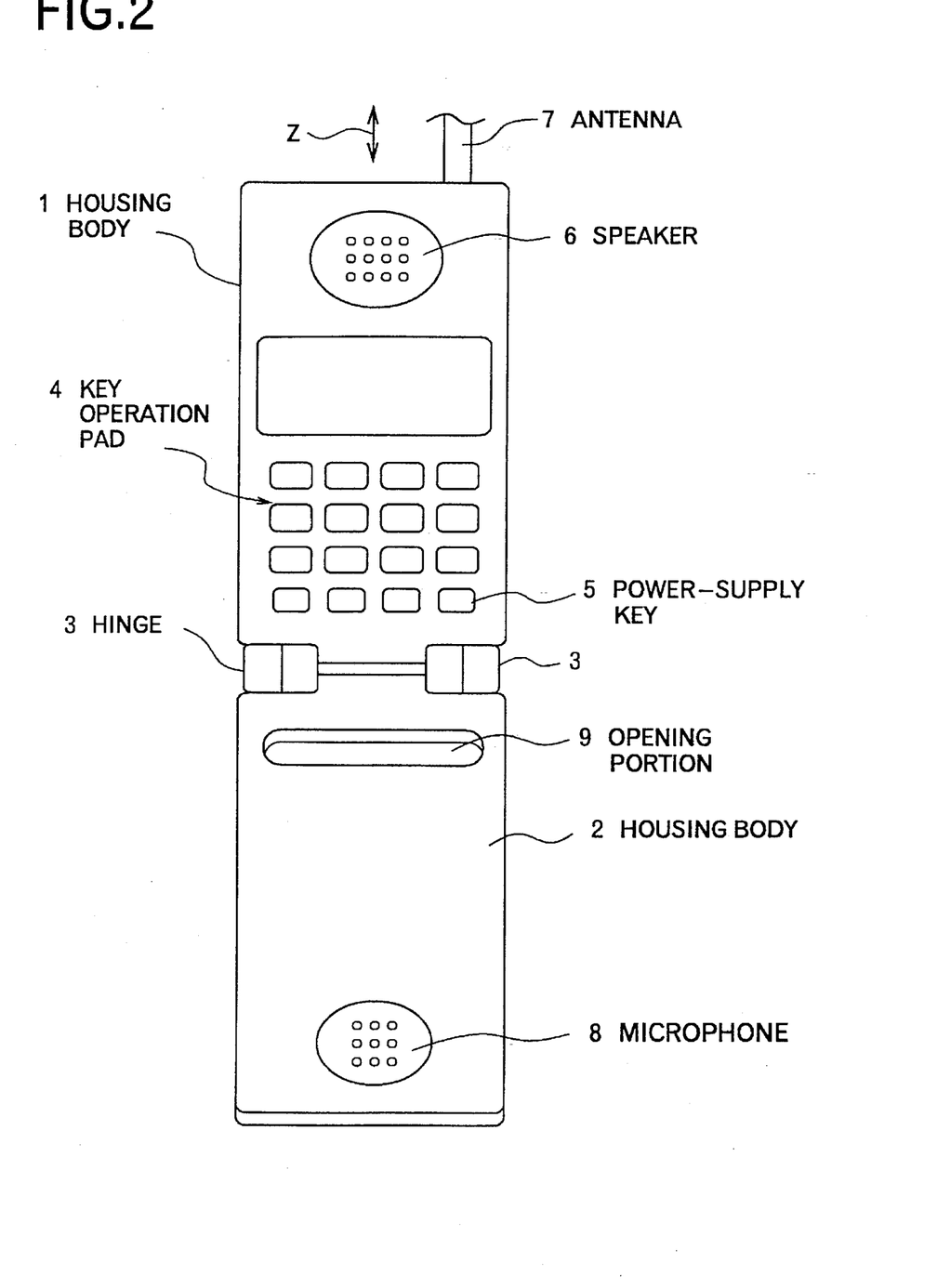
FIG. 2 is a plan view showing a portable radio apparatus according to a first embodiment of the present invention, the apparatus being in its open state.
Figure 3:
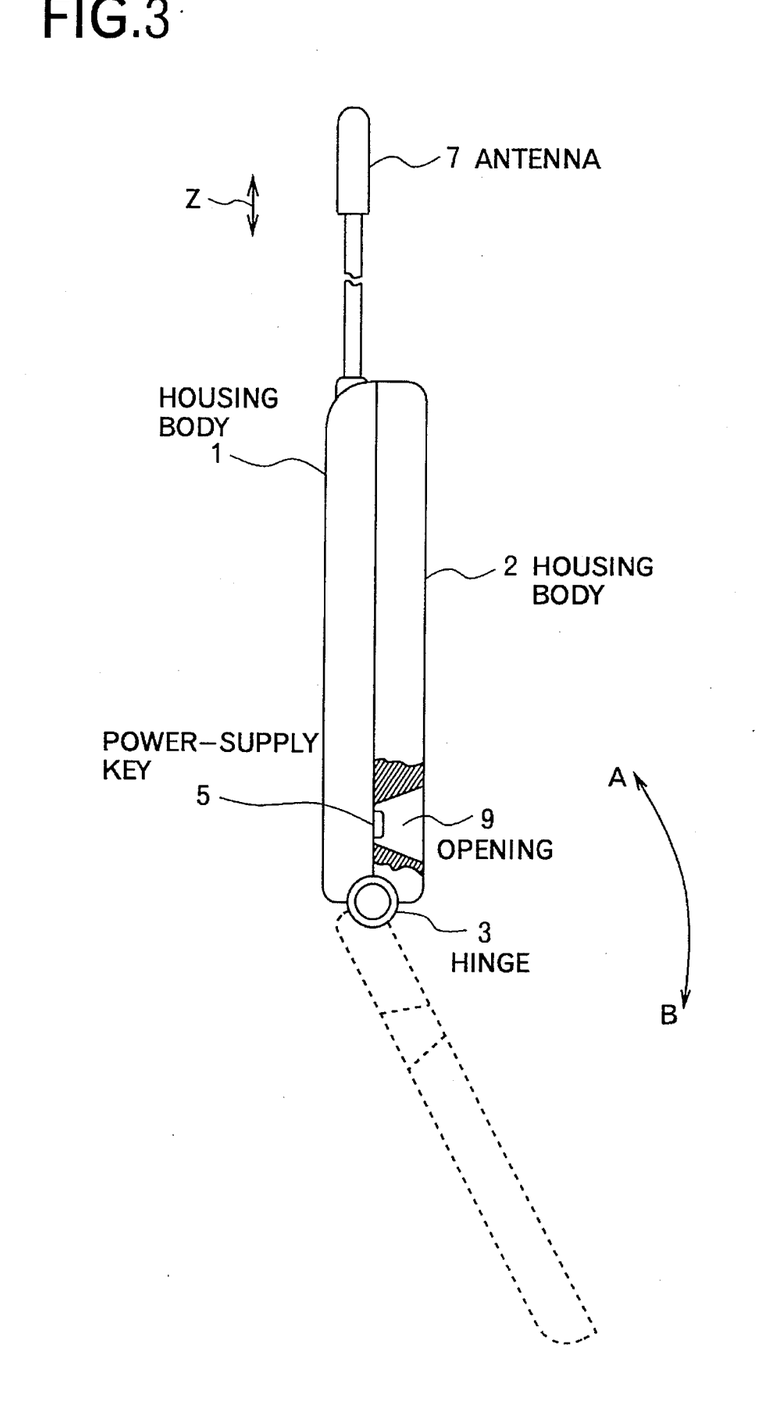
FIG. 3 is a side elevational view, partly broken away, of the portable radio apparatus of FIG. 2 in its closed state.
Figure 4:
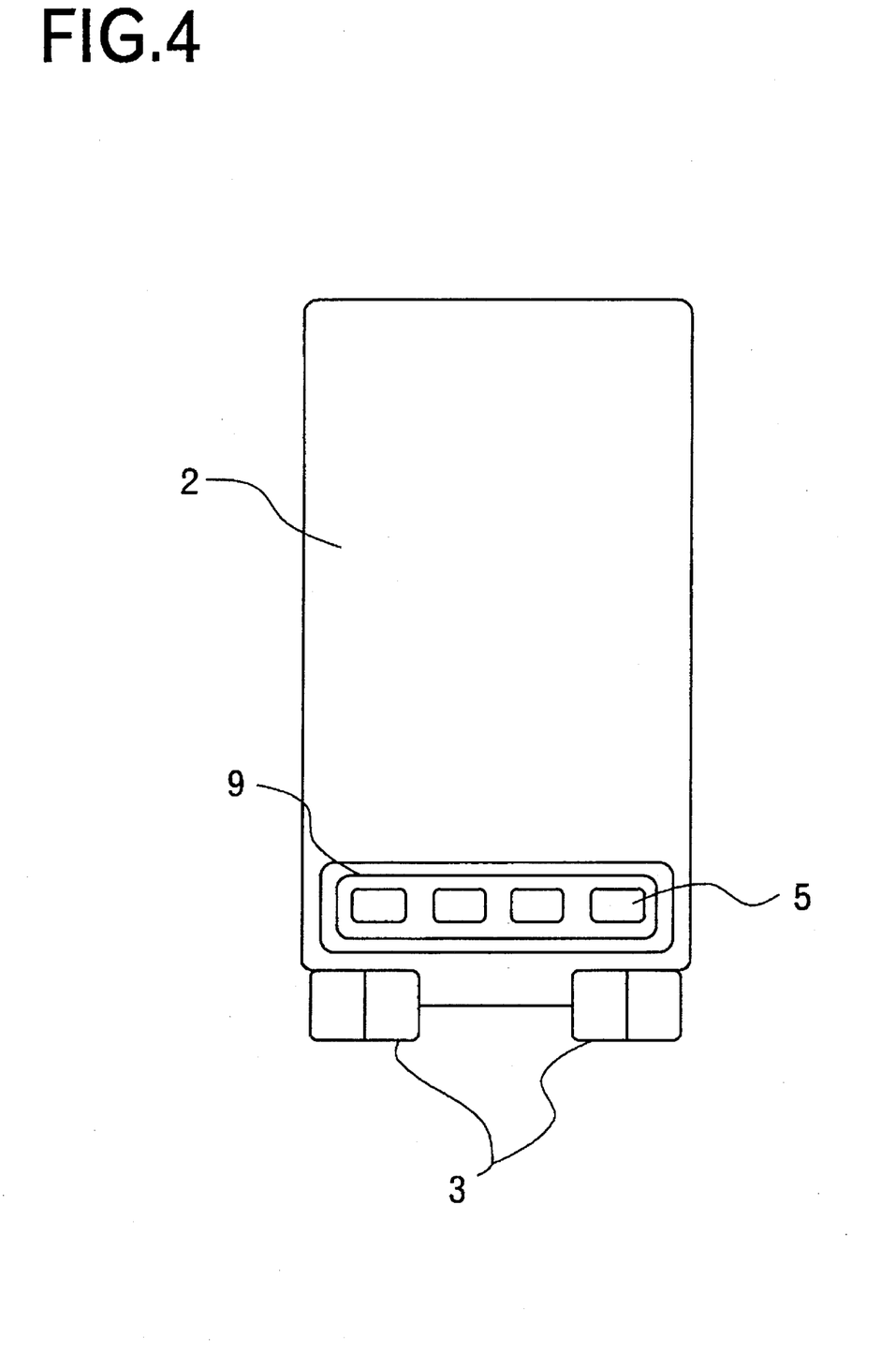
FIG. 4 is a plan view of the portable radio apparatus of FIG. 2 in the closed state.

Referring now in greater detail to the drawings and initially to FIGS. 2 to 4, there is shown a preferred embodiment of a portable radio apparatus in accordance with the present invention. The portable radio apparatus of this embodiment has a folding structure, and a housing body 1 and a housing body 2. The housing bodies 1 and 2 are connected through a hinge 3 with one another so that they can freely rotate in a predetermined angle range, as shown in FIG. 3. In this embodiment, the housing body 1 comprises a housing main body and the housing body 2 comprises a cover.

In FIG. 2, the housing body 1 is provided at the lower portion of the main surface thereof with a key operation pad such as a pushbutton dialing pad 4 in which a plurality of keys for dialing operation and other operations are arranged. The key operation pad 4 includes a power-supply key 5. On the upper portion of the main surface of the housing body 1 there is provided a speaker 6, and further on the upper end surface of the housing body 1 there is provided an antenna 7 freely extendible and contractible in the directions indicated by an arrow mark Z of FIG. 2.

The housing body 2 is provided with a microphone 8 and an opening portion 9 at the lower portion and the upper portion of the main surface thereof, respectively. The microphone 8 is so disposed as to be located at a position suitably away from the speaker 6 in the opened state of the housing body 2, as shown in FIG. 2. The opening portion 9 is placed where at least the power-supply key 5 of the key operation pad 4 is exposed when the housing body 2 is closed, as shown in FIGS. 3 and 4. The opening portion 9 is located so that necessary keys such as the power-supply key 5 can be operated even in the state in which the housing body 2 is closed. Further, the side walls of the opening portion 9 are tapered to allow users to operate the necessary keys easily, as shown in FIG. 3.

When the portable radio apparatus of this embodiment is used, as shown in FIG. 2, the antenna 7 is extended, the housing body 2 is opened in the direction B, and then the power-supply key 5 is pushed. The power-supply key 5 can also be pushed through the opening portion 9 even in the state in which the housing body 2 is closed, with the result that the opening and closing operation of the housing body 2 becomes dispensable when the power-supply key 5 is turned on and off. It is noted that if other necessary keys are exposed through the opening portion 9, other necessary operations can be performed when the apparatus is closed. When, on the other hand, the portable radio apparatus of this embodiment is not used, the antenna 7 is contracted into the housing body 1 and the housing body 2 is closed in the direction A, so the apparatus becomes handy to carry, as shown in FIG. 3.

Figure 5:
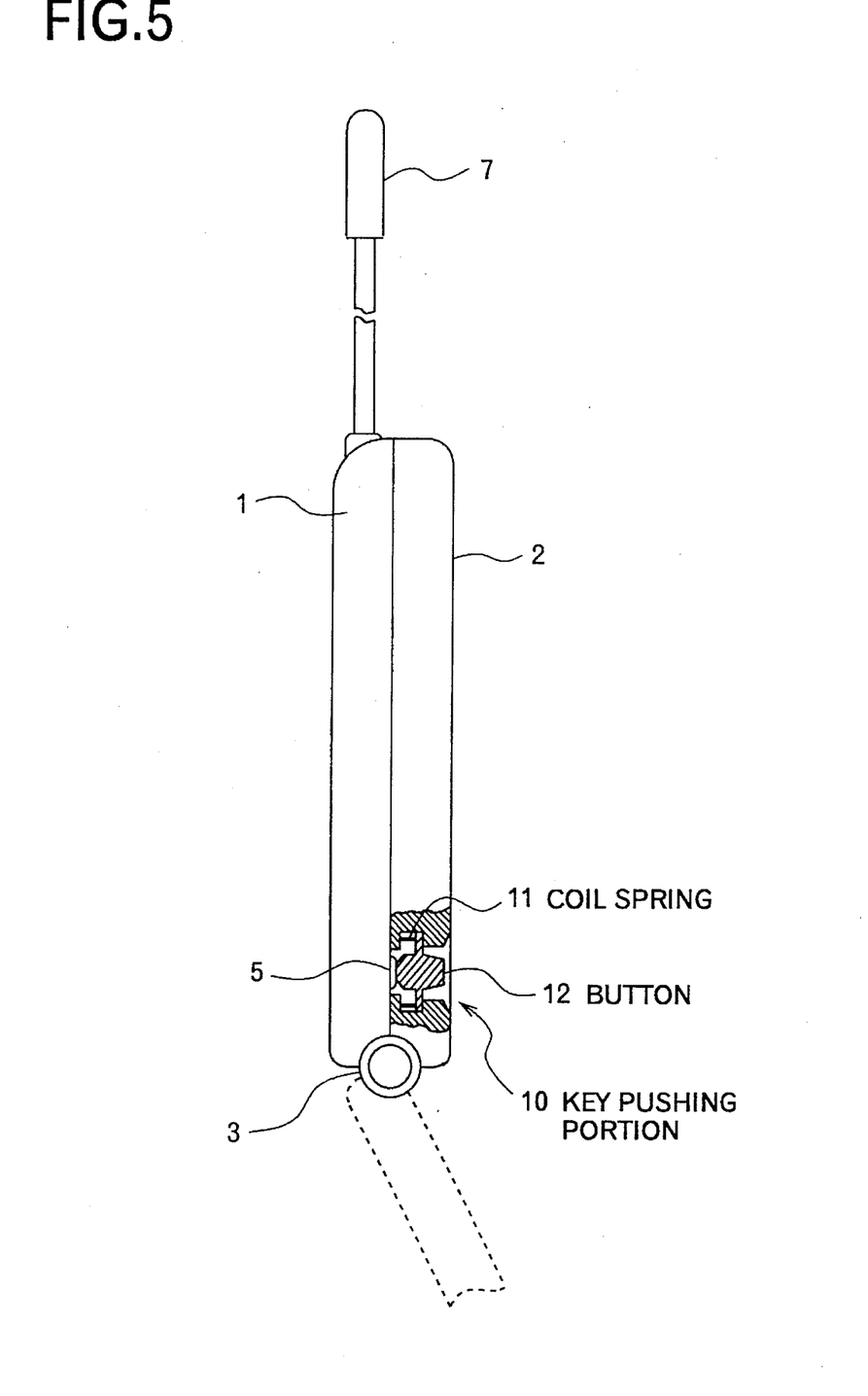
FIG. 5 is a side elevational view, partly broken away, showing a portable radio apparatus according to a second embodiment of the present invention, the apparatus being in its closed state.

FIG. 5 illustrates a portable radio apparatus constructed in accordance with a second embodiment of the present invention, the apparatus being in its closed state. Many of the parts of the second embodiment of FIG. 5 are identical to corresponding parts of the first embodiment of FIGS. 2 to 4 and the same reference numerals will be applied to the corresponding parts.

In this embodiment, a housing body 2 is provided with key pushing means 10 so that a power-supply key 5 and other keys of a housing body 1 can be pushed from the side of the housing body 2 with force, as shown in FIG. 5. The key pushing means 10 comprises a coil spring 11 and a button 12. The button 12 is fitted into the opening portion of the housing body 2 with its flange portion biased outward by means of the coil spring 11. Consequently, the power-supply key 5 can be pushed when the apparatus is closed, by pushing the button 12 against the biasing force of the coil spring 11. Thus, a provision of the key pushing means 10 makes it possible to push the power-supply key 5 easily from the side of the housing body 2, with the result that the key operability is further enhanced. It is a matter of course that the key pushing means 10 may be provided so as to correspond not only to the power-supply key 5 but to necessary keys. In addition, the construction of the key pushing means 10 is not limited to this embodiment but various other kinds of constructions are also possible. For example, the key pushing means 10 of the housing body 2 may also be formed with a member having elasticity.

Figure 6:
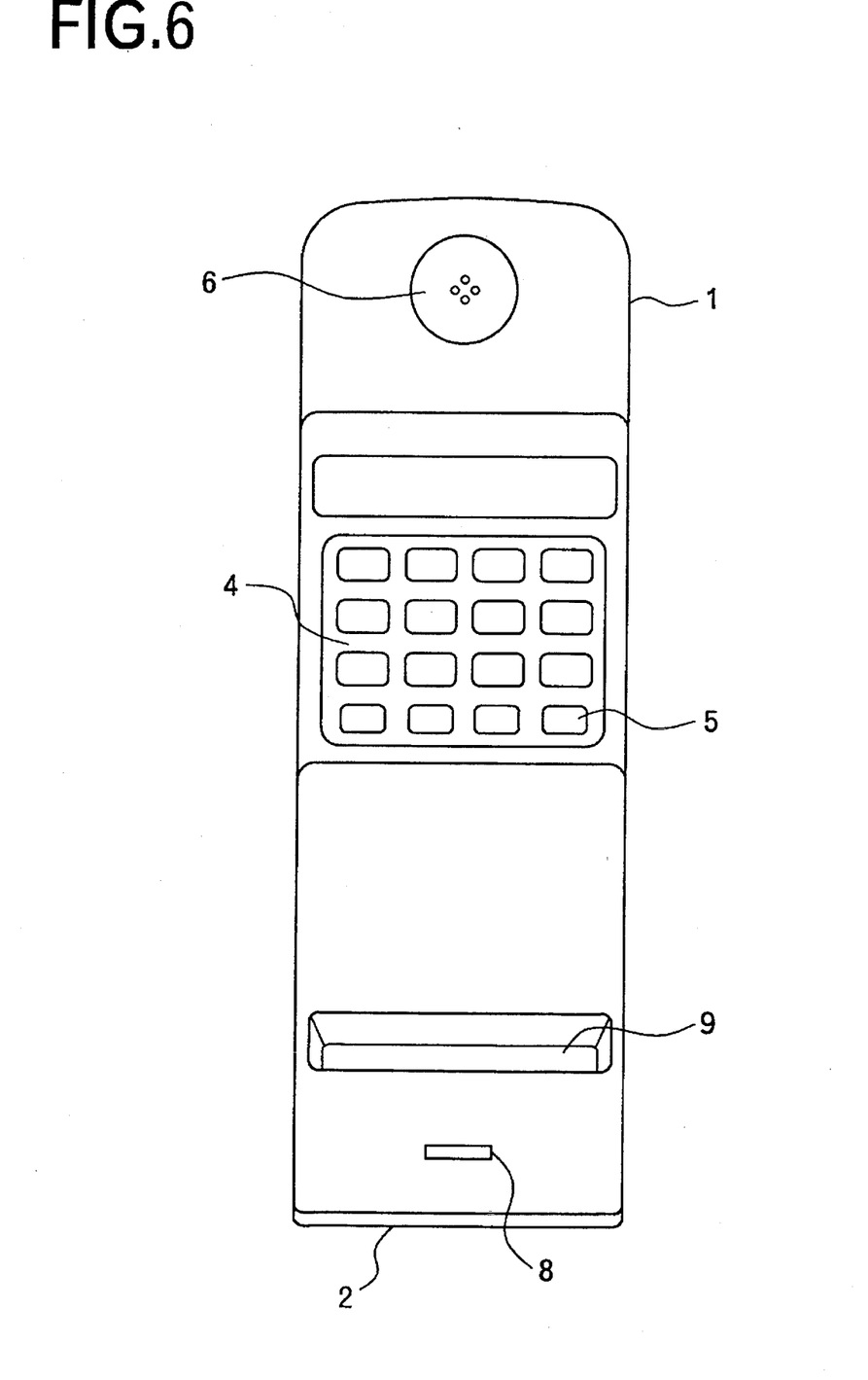
FIG. 6 is a plan view showing a portable radio apparatus according to a third embodiment of the present invention, the apparatus being in its open state.
Figure 7:
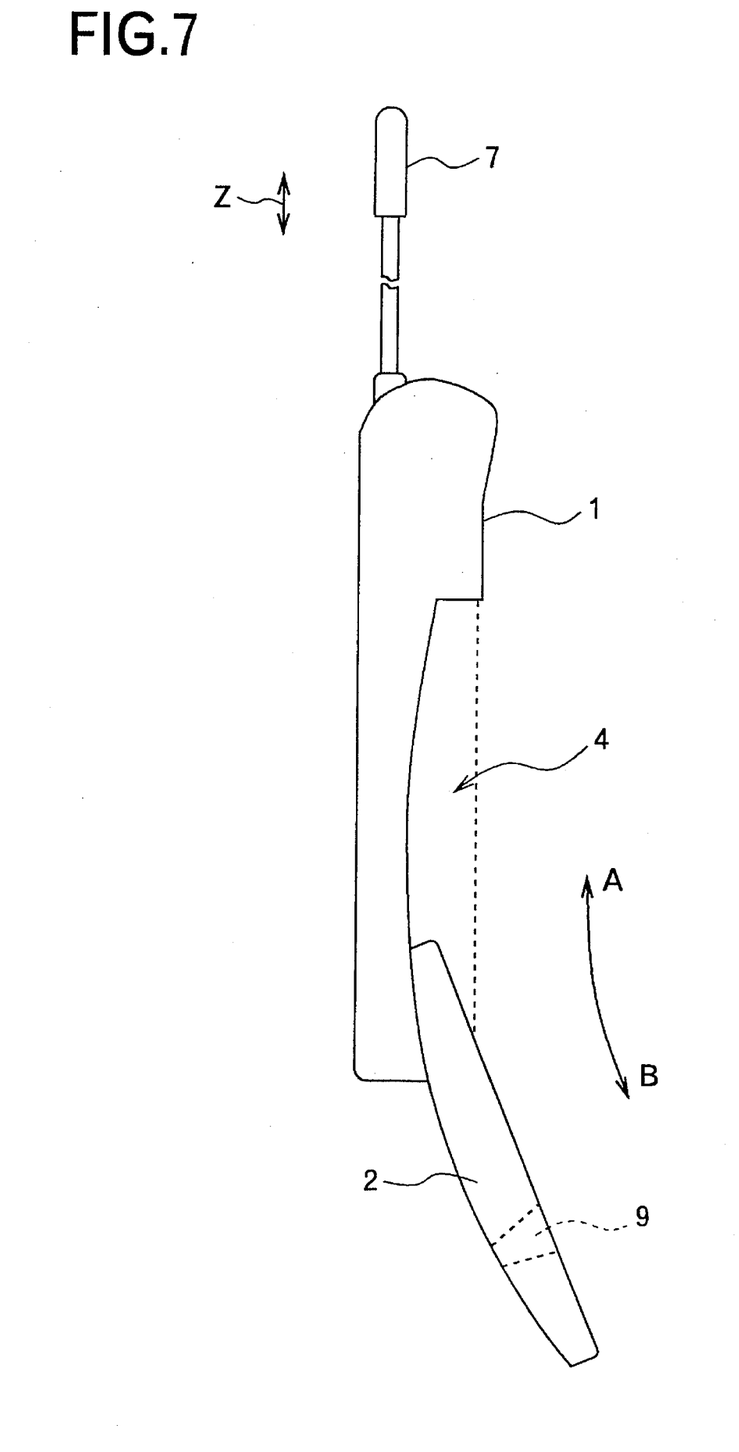
FIG. 7 is a side elevational view of the portable radio apparatus of FIG. 6 in the open state.
Figure 8:
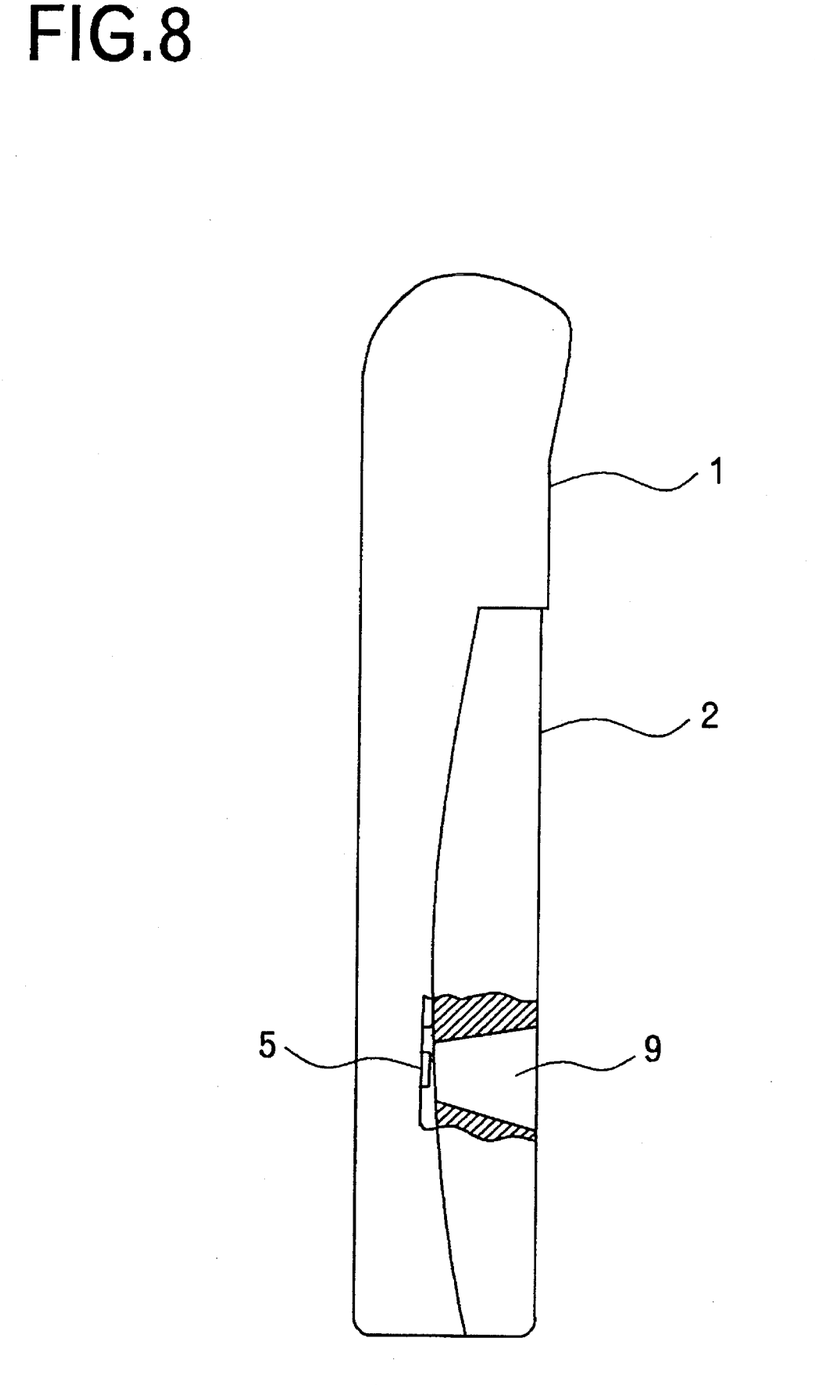
FIG. 8 is a side elevational view, partly broken away, of the portable radio apparatus of FIG. 6 in its closed state.

FIGS. 6 to 8 illustrate a portable radio apparatus constructed in accordance with a third embodiment of the present invention. The same reference numerals will be applied to members having the same functions as those of the first embodiment of FIGS. 2 to 4. Unlike the first embodiment, the portable radio apparatus according to this embodiment has a slide open-closed structure, and a housing body 1 and a housing body 2 are slidably connected through their curved surfaces with each other. In this embodiment, the housing body 1 comprises a housing main body and the housing body 2 comprises a cover.

In FIGS. 6 and 7, the housing body 1 is provided at the lower portion of the curved surface thereof with a key operation pad such as a pushbutton dialing pad 4 in which a plurality of keys for dialing operation and other operations are arranged. The key operation pad 4 includes a power-supply key 5. On the upper portion of the main surface of the housing body 1 there is provided a speaker 6, and further on the upper end surface of the housing body 1 there is provided an antenna 7 freely extendible and contractible in the directions indicated by an arrow mark Z of FIG. 7.

The housing body 2 is provided at the outer flat surface thereof with a microphone 8 and an opening portion 9. The microphone 8 is so disposed as to be located at a position suitably away from the speaker 6 in the state in which the housing body 2 is open, as shown in FIGS. 6 and 7. The opening portion 9 is placed where at least the power-supply key 5 of the key operation pad 4 is exposed when the housing body 2 is closed, as shown in FIG. 8. The opening portion 9 is located so that necessary keys such as the power-supply key 5 can be operated even in the state in which the housing body 2 is closed. Further, the side walls of the opening portion 9 are tapered to allow users to operate the necessary keys easily, as shown in FIG. 8.

When the portable radio apparatus of this embodiment is used, the antenna 7 is extended, the housing body 2 is slid in the direction B, and then the power-supply key 5 is pushed, as shown in FIGS. 5 and 6. The power-supply key 5 can also be pushed through the opening portion 9 even when the apparatus is closed. If other necessary keys are exposed through the opening portion 9, necessary operations can be performed in the state in which the apparatus is closed. When, on the other hand, the portable radio apparatus of this embodiment is not used, the antenna 7 is contracted into the housing body 1 and the housing body 2 is slid in the direction A, so the apparatus becomes handy to carry. It is noted that, if key pushing means 10 such as that shown in FIG. 5 instead of the opening portion 9 is formed in the housing body 2, the key operability can further be improved.

Figure 9:
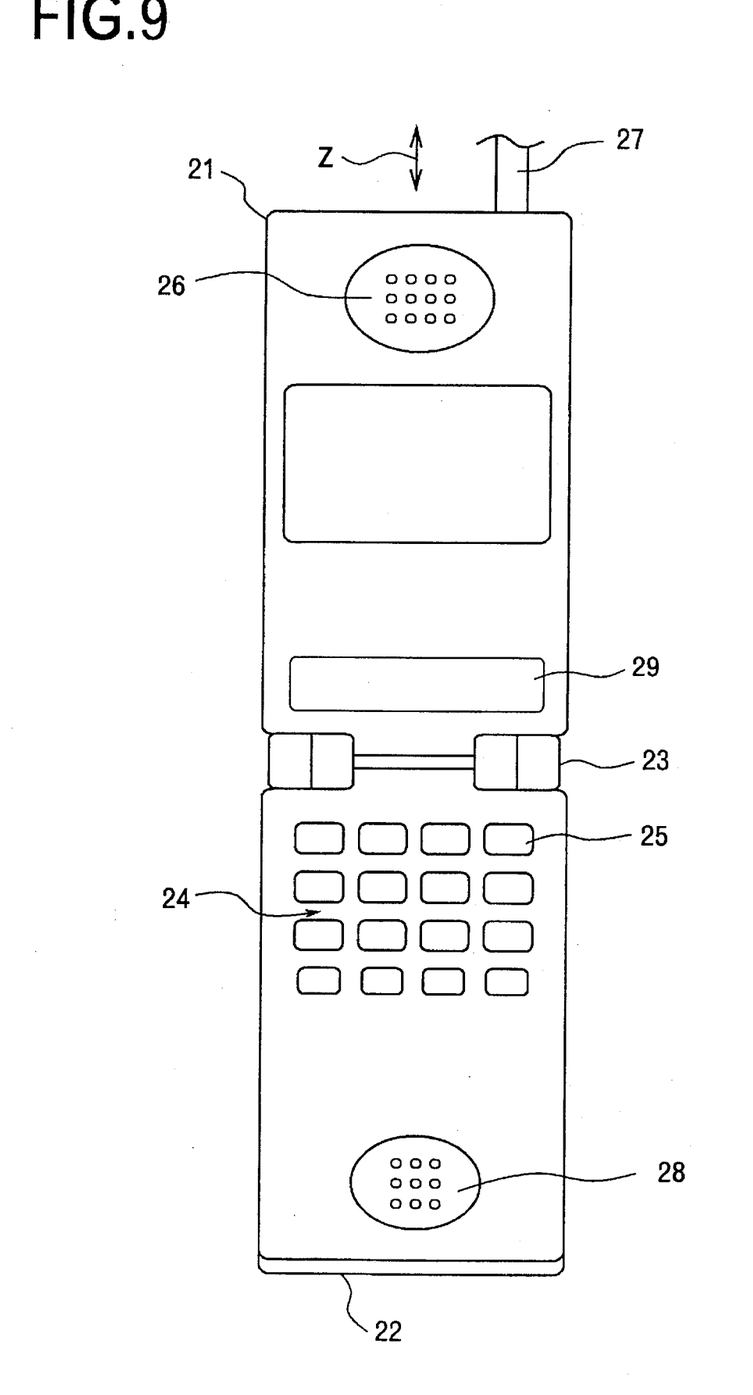
FIG. 9 is a plan view showing a portable radio apparatus according to a fourth embodiment of the present invention, the apparatus being in its open state.
Figure 10:
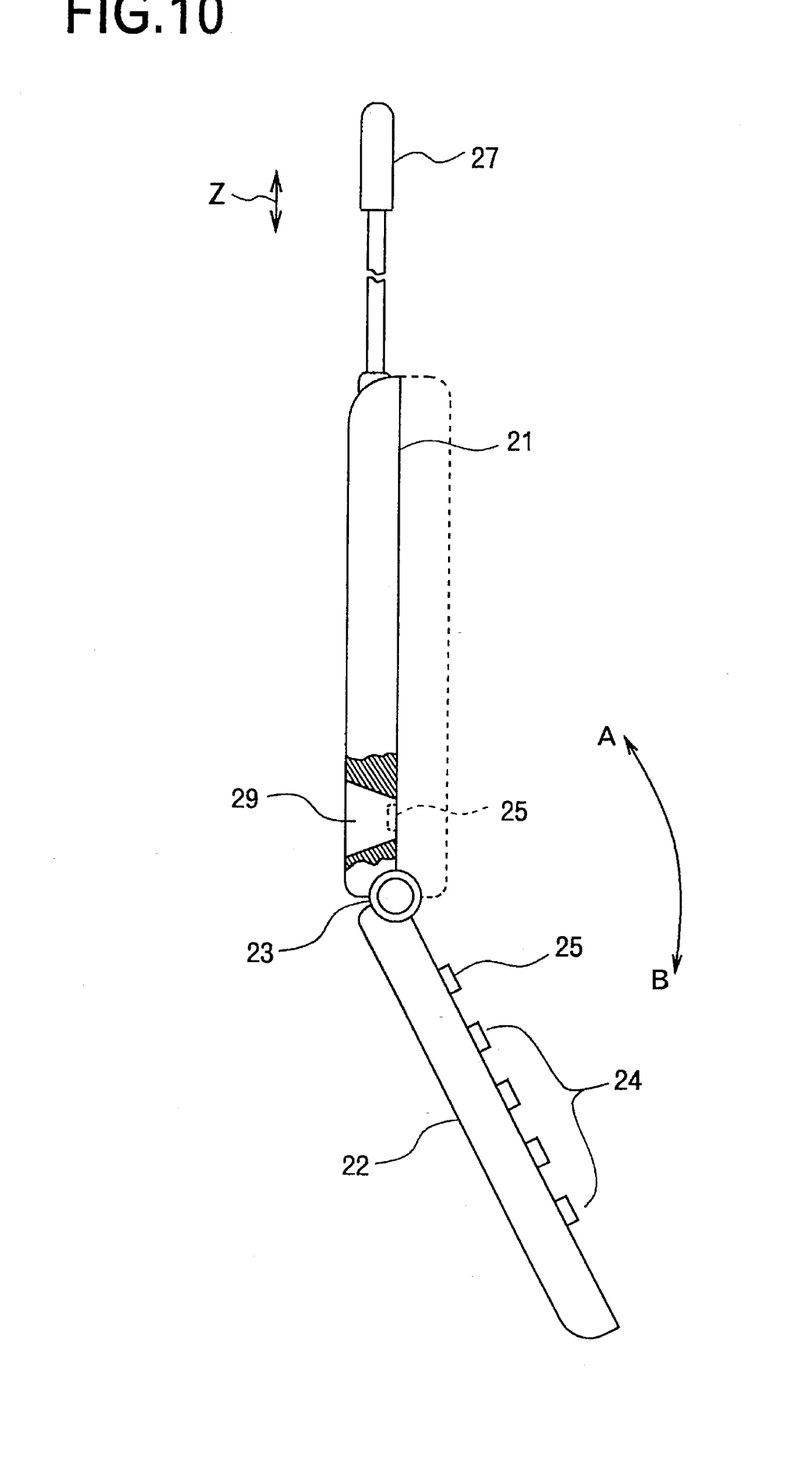
FIG. 10 is a side elevational view, partly broken away, of the portable radio apparatus of FIG. 9 in the open state.
Figure 11:
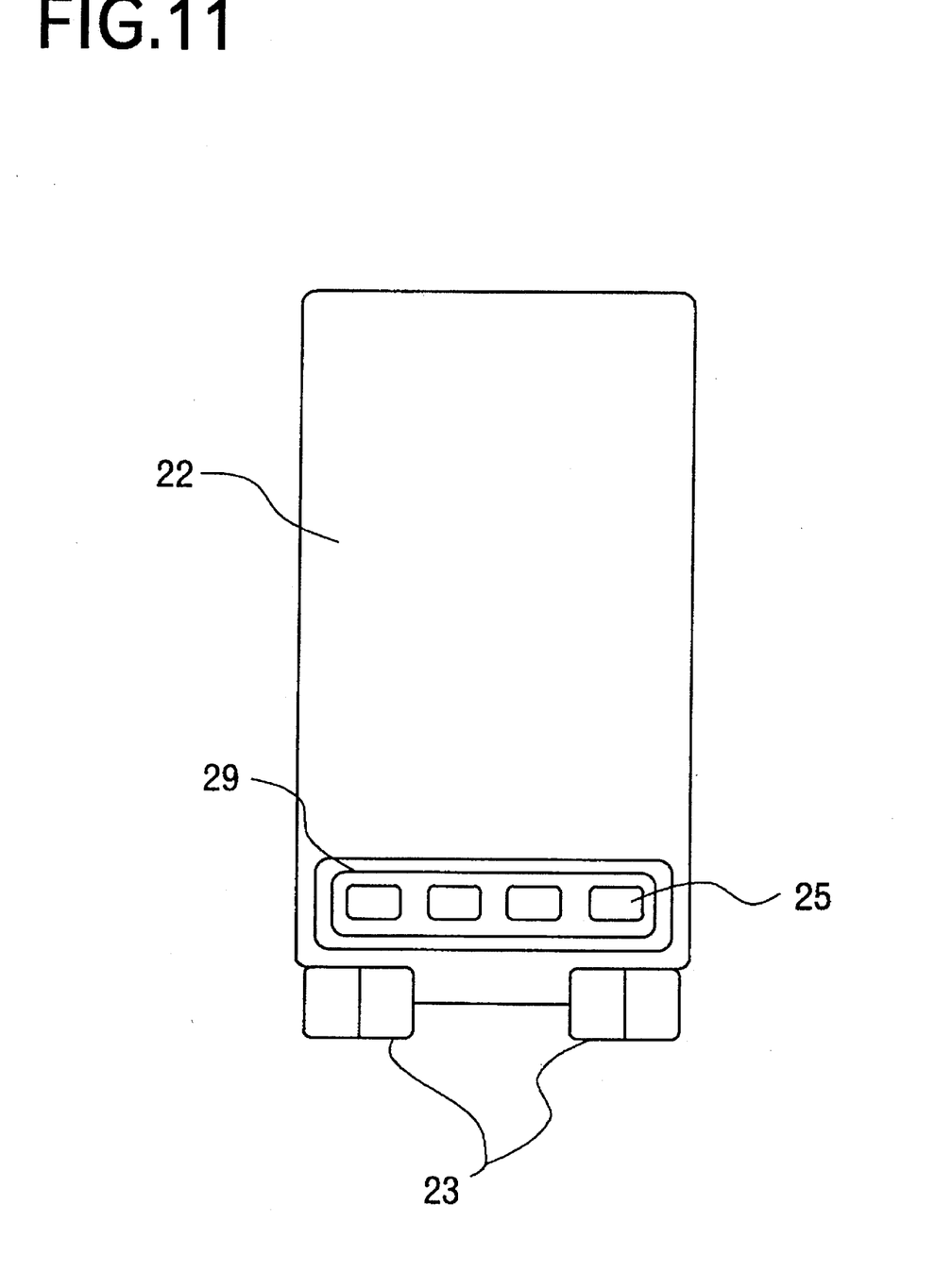
FIG. 11 is a plan view of the portable radio apparatus of FIG. 9 in its closed state.

FIGS. 9 to 11 illustrate a portable radio apparatus constructed in accordance with a fourth embodiment of the present invention. Like the first embodiment of FIGS. 2 to 4, the portable radio apparatus according to this embodiment has a folding structure, and housing bodies 21 and 22 are connected through a hinge 23 with each other so that they can freely rotate in a predetermined angle range, as shown in FIG. 10.

In FIG. 9, the housing body 21 is provided at the upper portion of the main surface thereof with a speaker 26 and at the upper end surface with an antenna 27 freely extendible and contractible in the directions indicated by an arrow mark Z. The housing body 21 is further provided at the lower portion of the main surface with an opening portion 29.

The housing body 22 is provided at the lower portion of the main surface thereof with a key operation pad such as a pushbutton dialing pad 24 in which a plurality of keys for dialing operation and other operations are arranged. The key operation pad 24 includes a power-supply key 25. The housing body 22 is further provided at the upper portion of the main surface with a microphone 28. The microphone 28 is so disposed as to be located at a position suitably away from the speaker 26 in the state in which the housing body 22 is open, as shown in FIGS. 9 and 10. The opening portion 29 of the housing body 21 is provided at a position by which at least the power-supply key 25 of the key operation pad 24 is exposed when the apparatus is closed, as shown in FIG. 11. The opening portion 29 is located so that necessary keys such as the power-supply key 25 can be operated even when the apparatus is closed. Further, the side walls of the opening portion 29 are tapered to allow users to operate the necessary keys easily, as shown in FIG. 10.

When the portable radio apparatus of this embodiment is used, the antenna 27 is extended, the housing body 22 is opened in the direction B, and then the power-supply key 25 is pushed, as shown in FIG. 10. The power-supply key 25 can also be pushed through the opening portion 29 even when the apparatus is closed, as shown in FIG. 11. It is noted that, if other necessary keys are exposed through the opening portion 29, necessary operations can also be performed when the apparatus is closed. When, on the other hand, the portable radio apparatus of this embodiment is not used, the antenna 27 is contracted into the housing body 21 and the housing body 22 is closed in the direction A, so the apparatus becomes handy to carry, as shown in FIG. 11.

Figure 12:
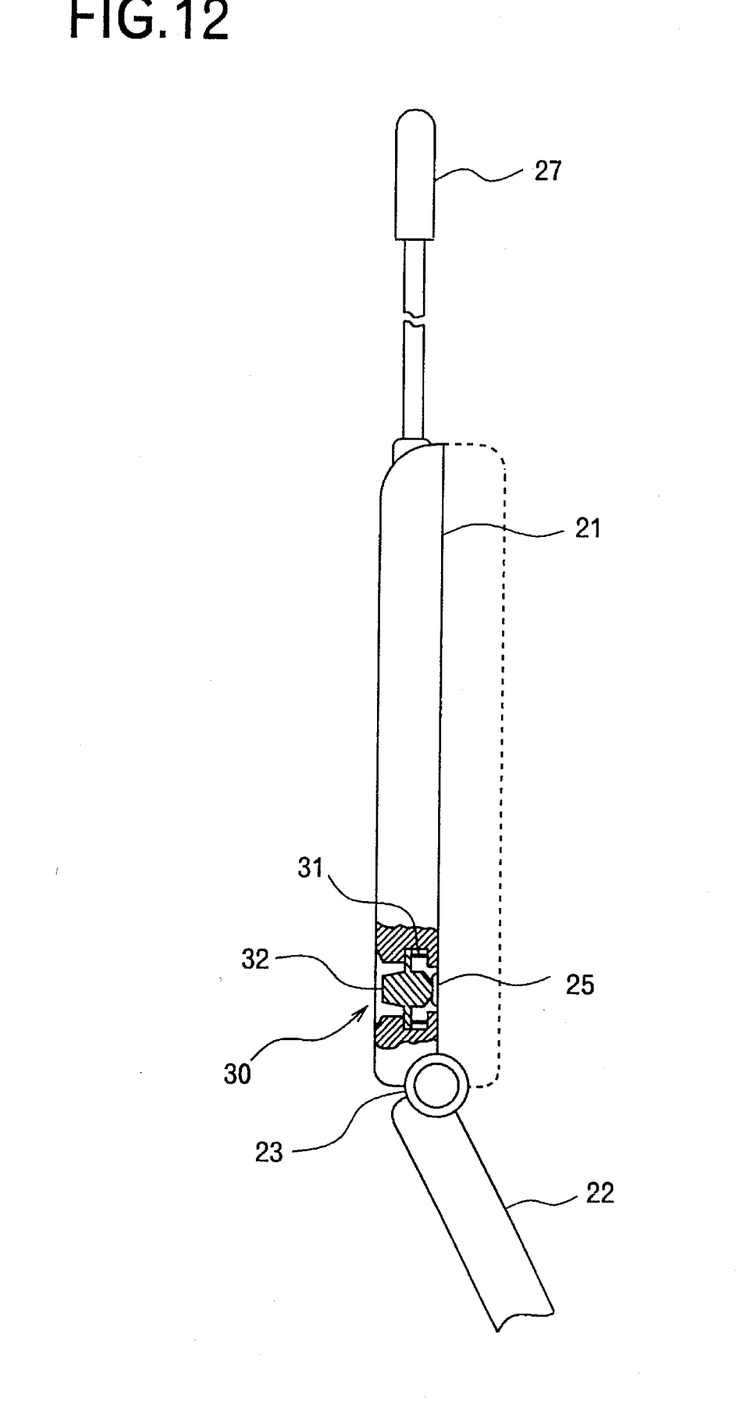
FIG. 12 is a side elevational view, partly broken away, showing a portable radio apparatus according to a fifth embodiment of the present invention, the apparatus being in its open state.

FIG. 12 illustrates a portable radio apparatus constructed in accordance with a fifth embodiment of the present invention, the apparatus being in its open state. Many of the parts of the fifth embodiment of FIG. 12 are identical to corresponding parts of the fourth embodiment of FIGS. 9 to 11 and the same reference numerals will be applied to the corresponding parts.

In this embodiment, a housing body 21 is provided with key pushing means 30 so that a power-supply key 25 and other keys of a housing body 22 can be pushed from the side of the housing body 21 with force, as shown in FIG. 12. The key pushing means 30 comprises a coil spring 31 and a button 32. The button 32 is fitted into the opening portion of the housing body 21 with its flange portion biased outward by means of the coil spring 31. Therefore, if the housing body 22 is closed and then the button 32 is pushed against the biasing force of the coil spring 31, the power-supply key 25 can be pushed with the apparatus closed. Further, if the key pushing means 30 such as this is provided at a position corresponding to a necessary key, the necessary key can also be operated from the side of the housing body 21, so the key operability of the portable radio apparatus is further enhanced. In addition, the construction of the key pushing means 30 is not limited to this embodiment but various kinds of constructions are also possible. For example, the key pushing means 30 of the housing body 21 may also be formed with an elastic member.

Figure 13:
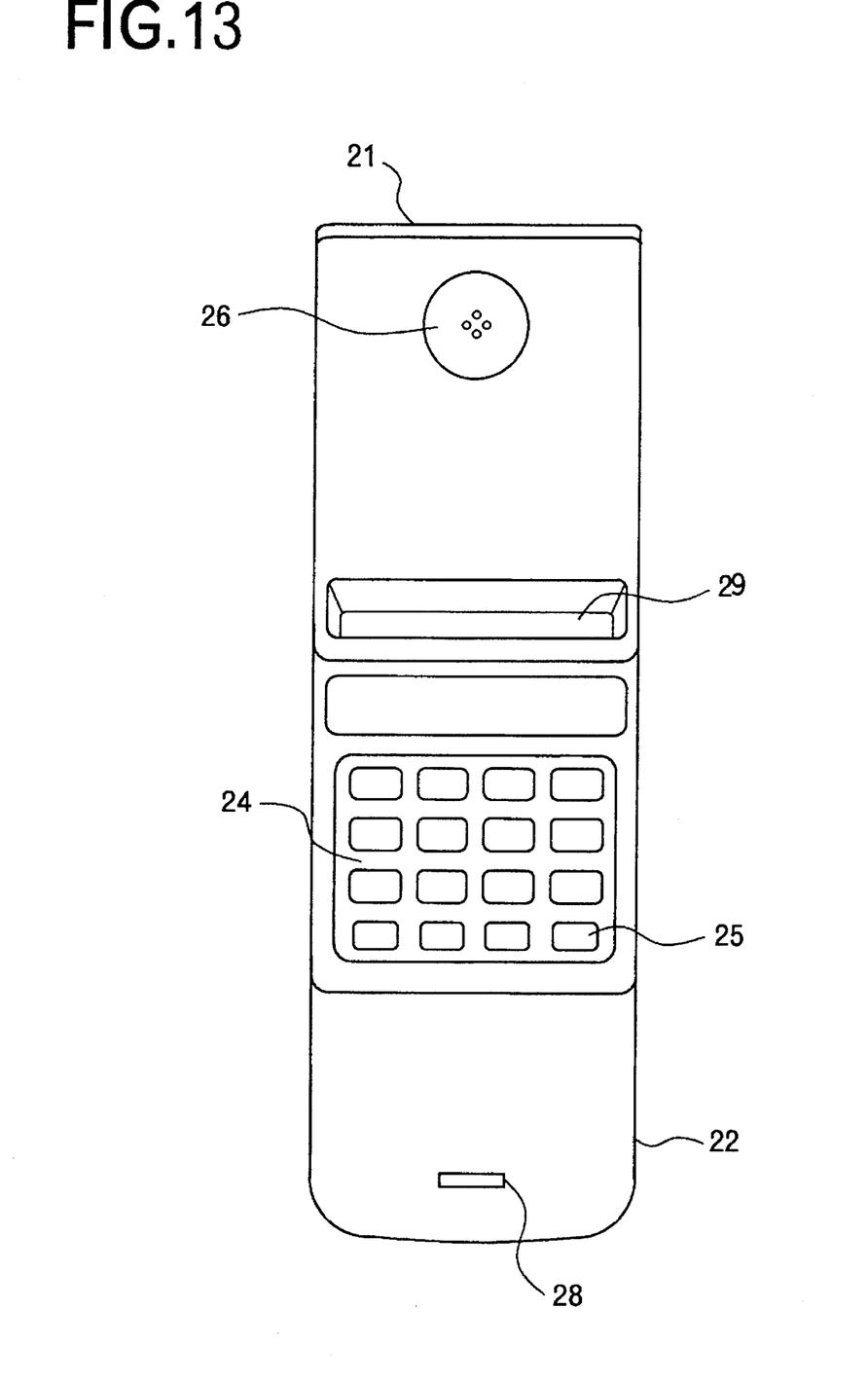
FIG. 13 is a plan view showing a portable radio apparatus according to a sixth embodiment of the present invention, the apparatus being in its open state.
Figure 14:
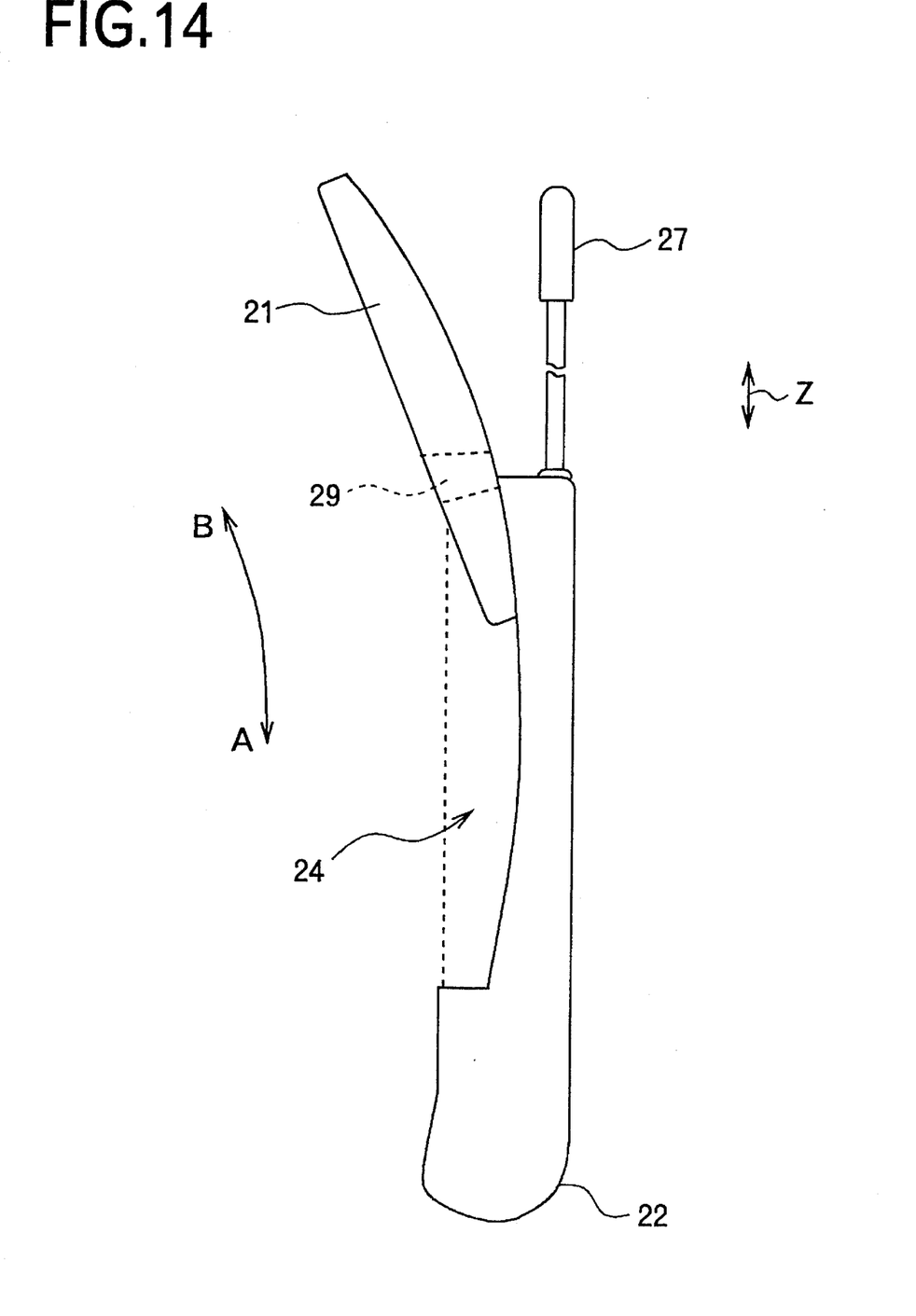
FIG. 14 is a side elevational view of the portable radio apparatus of FIG. 13 in the open state.
Figure 15:
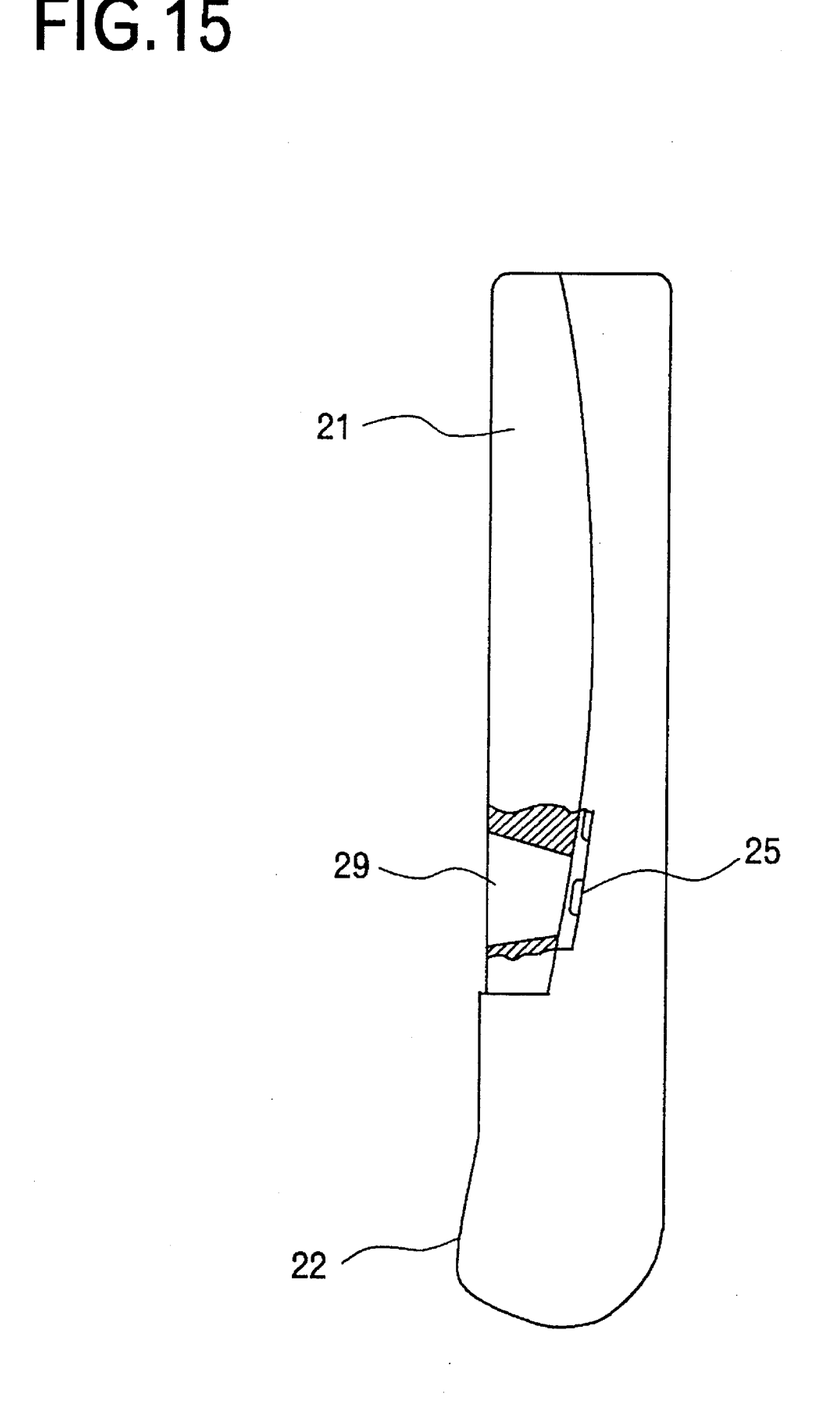
FIG. 15 is a side elevational view, partly broken away, of the portable radio apparatus of FIG. 13 in its closed state.

FIGS. 13 to 15 show a portable radio apparatus constructed in accordance with a sixth embodiment of the present invention. The portable radio apparatus according to this embodiment has a slide open-closed structure, and a housing body 21 and a housing body 22 are slidably connected through their curved surfaces with each other. Unlike the first embodiment of FIG. 2, the housing body 21 comprises a cover, and the housing body 22 comprises a housing main body.

In FIGS. 13 and 15, the housing body 21 is provided at the upper portion of the main surface thereof with a speaker 26 and at the lower portion with an opening portion 29. The housing body 22 is provided at the curved surface thereof with a key operation pad such as a pushbutton dialing pad 24 in which a plurality of keys for dialing operation and other operations are arranged. The key operation pad 24 includes a power-supply key 25. The housing body 22 is further provided at the upper end surface with an antenna 27 freely extendible and contractible in the directions indicated by an arrow mark Z. The housing body 22 is further provided at the lower portion of the main surface with a microphone 28. The microphone 28 is so disposed as to be located at a position suitably away from the speaker 26 in the state when the housing body is open. The opening portion 29 of the housing body 21 is placed where at least the power-supply key 25 of the key operation pad 24 is exposed when the apparatus is closed, as shown in FIG. 15. The opening portion 29 is located so that necessary keys such as the power-supply key 25 can be operated even when the apparatus is closed. Further, the side walls of the opening portion 29 are tapered to allow users to operate the necessary keys easily, as shown in FIG. 15.

When the portable radio apparatus of this embodiment is used, the antenna 27 is extended, the housing body 22 is opened in the direction B, and then the power-supply key 25 is pushed, as shown in FIGS. 13 and 14. The power-supply key 25 can also be pushed through the opening portion 29 even when the apparatus is closed, as shown in FIG. 15. It is noted that, if other necessary keys are exposed through the opening portion 29, necessary operations can also be performed when the apparatus is closed. When, on the other hand, the portable radio apparatus of this embodiment is not used, the antenna 27 is contracted into the housing body 22 and the housing body 21 is closed in the direction A, so the apparatus becomes handy to carry, as shown in FIG. 15. It is noted that, if key pushing means 30 such as that shown in FIG. 12 instead of the opening portion 29 is formed in the housing body 21, the key operability can further be improved. It is also noted that the key operation pad 4 or 24 of the above-described first to sixth embodiments may be constituted by a liquid crystal touch panel.

As has been described hereinbefore, the portable radio apparatus according to the present invention is able to perform the key operation without being opened while the apparatus is being carried. This therefore enhances the operability of the portable radio apparatus, because necessary keys are exposed through the opening portion of the second housing body or can be pushed with the key pushing means, when the apparatus is closed.

While the subject invention has been described with relation to the preferred embodiments, various modifications and adaptations thereof will now be apparent to those skilled in the art. All such modifications and adaptations as fall within the scope of the appended claims are intended to be covered thereby.

What is claimed is:

1. A portable radio apparatus comprising:

a first housing body having at least a key operation pad comprising a plurality of keys; and a second housing body connected to said first housing body such that the apparatus is freely opened and closed, said key operation pad of said first housing body being covered with said second housing body, when necessary;

said second housing body being provided with key operation means for operating at least one key of said plurality of keys of said key operation pad in a state in which said first and second housing bodies are closed, wherein said at least one key of said plurality of keys of said key operation pad comprises a power-supply key.

2. The portable radio apparatus as set forth in claim 1, wherein said first housing body and said second housing body are rotatably connected with each other so that said first and second housing bodies are rotatable relative to one another in a predetermined angle range.

3. The portable radio apparatus as set forth in claim 1, wherein said first housing body and said second housing body are slidably connected relative to one another so as to allow the apparatus to be extended and contracted.

4. The portable radio apparatus as set forth in claim 1, wherein said key operation means comprises an opening so that at least one key of said plurality of keys of said key operation pad is exposed through said opening in a state in which said first and second housing bodies are closed.

5. The portable radio apparatus as set forth in claim 4, wherein said first housing body and said second housing body are rotatably connected with each other so that said first and second housing bodies are rotatable relative to one another in a predetermined angle range.

6. The portable radio apparatus as set forth in claim 4, wherein said first housing body and said second housing body are slidably connected relative to one another so as to allow the apparatus to be extended and contracted.

7. The portable radio apparatus as set forth in claim 1, wherein said key operation means comprises key pushing means for operating at least one key of said plurality of keys of said key operation pad in a state in which said first and second housing bodies are closed.

8. The portable radio apparatus as set forth in claim 7, wherein said key pushing means comprises at least a movable member energized by energizing means in an opposite direction to a direction in which said plurality of keys are pushed.

9. The portable radio apparatus as set forth in claim 7, wherein said first housing body and said second housing body are rotatably connected with each other so that said first and second housing bodies are rotatable relative to one another in a predetermined angle range.

10. The portable radio apparatus as set forth in claim 7, wherein said first housing body and said second housing body are slidably connected relative to one another so as to allow the apparatus to be extended and contracted.

11. A portable radio apparatus comprising:

a first housing body having at least a key operation pad comprising a plurality of keys; and a second housing body connected to said first housing body such that the apparatus is freely opened and closed, said key operation pad of said first housing body being covered with said second housing body, when necessary;

said second housing body being provided with an opening placed to allow direct access and operation of at least one key of said plurality of keys of said key operation pad in a state in which said first and second housing bodies are closed, said opening being surrounded by sidewalls.

12. The portable radio apparatus as set forth in claim 11, wherein said sidewalls are tapered to allow easy operation of at least one key of said plurality of keys of said key operation pad in a state in which said first and second housing bodies are closed.

13. The portable radio apparatus as set forth in claim 12, wherein said opening allows easy operation of at least a power-supply key.

14. The portable radio apparatus as set forth in claim 12, wherein said first housing body and said second housing body are rotatably connected with each other so that said first and second housing bodies are rotatable relative to one another in a predetermined angle range.

15. The portable radio apparatus as set forth in claim 14, wherein said rotatable connection is placed at a bottom portion of said first housing body and at a top portion of said second housing body.

16. The portable radio apparatus as set forth in claim 14, wherein said rotatable connection is placed at a bottom portion of said second housing body and at a top portion of said first housing body.

17. The portable radio apparatus as set forth in claim 15, wherein said opening is placed near said rotatable connection at the top portion of said second housing body.

18. The portable radio apparatus as set forth in claim 16, wherein said opening is placed near said rotatable connection at the bottom portion of said second housing body.

19. The portable radio apparatus as set forth in claim 12, wherein said first housing body and said second housing body are slidably connected relative to one another so as to allow the apparatus to be extended and contracted.

20. The portable radio apparatus as set forth in claim 19, wherein said first housing body further comprises a curved groove along which said second housing body is slidably connected to said first housing body.

21. The portable radio apparatus as set forth in claim 19, wherein said second housing body further comprises a curved groove along which said first housing body is slidably connected to said second housing body.

* * * * *